L. Griscom,
Turning Lathe,

No. 77,812.            Patented May 12, 1868.

Witnesses.            Inventor
W. C. Aslikettoz            L. Griscom
J. A. Fraser            per Munn & Co.
           Attorneys

United States Patent Office.

LEWIS GRISCOM, OF MAHANOY PLANE, PENNSYLVANIA.

*Letters Patent No. 77,812, dated May 12, 1868.*

---

IMPROVEMENT IN LATHES.

---

The Schedule referred to in these Letters Patent and making part of the same.

---

TO ALL WHOM IT MAY CONCERN:

Be it known that I, LEWIS GRISCOM, of Mahanoy Plane, in the county of Schuylkill, and State of Pennsylvania, have invented a new and improved Automatic Cross-Feed for Lathes or Boring-Machines; and I do hereby declare that the following is a full, clear, and exact description thereof, which will enable those skilled in the art to make and use the same, reference being had to the accompanying drawings, forming part of this specification.

The object of this invention is to accomplish the cutting of tapers on shafts, and the boring of the corresponding tapering hole for the reception of the tapered shaft, in a simple, accurate, and automatic manner, which will hereinafter be fully set forth.

Heretofore, the method of boring or turning tapers commonly practised was to operate the cross-feed by means of a hand-wheel or crank, which required a skillful workman to operate with any degree of success in procuring a good fit of the tapered parts.

Those skilled in the art of fitting the taper of metal shafts to a corresponding hole for the reception of the same are conversant with the care, time, and expense necessary to produce a good fit of the parts, all of which is mainly due to the unavoidable inaccuracy attendant upon the operating of the cross-feed of the tool by hand.

These disadvantages are obviated by my improvements, which will now be set forth.

In the accompanying plate of drawings—

Figure 1:
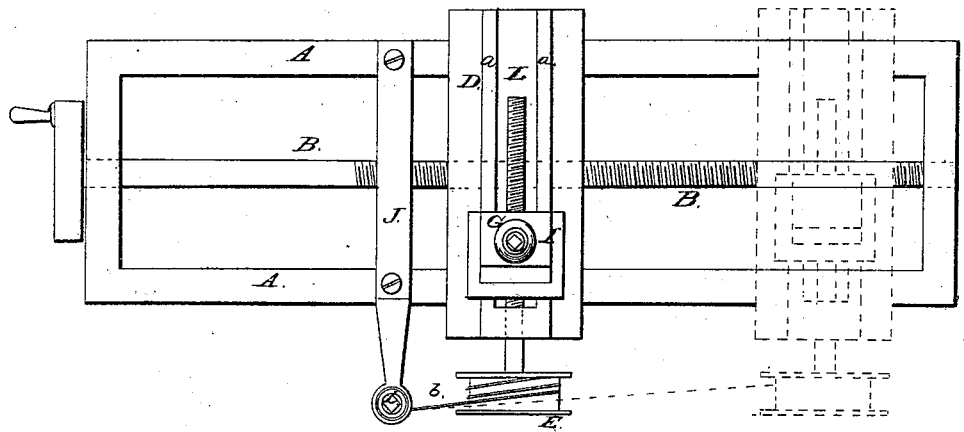
Figure 2:
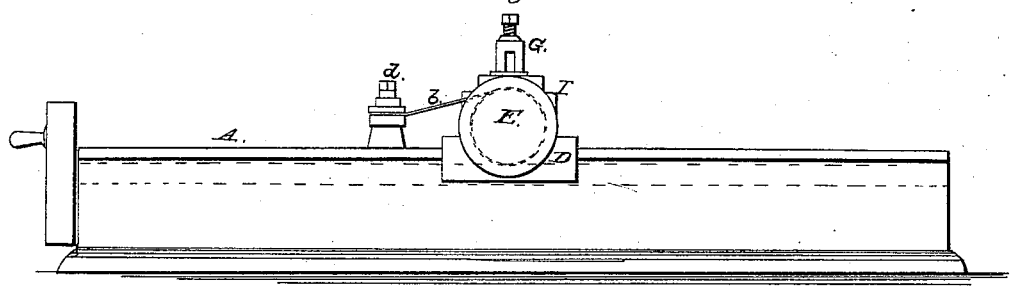

Figure 1 represents a top view of my improvements attached to the slide-rest of an ordinary lathe, and Figure 2 represents a side view of the same.

Similar letters of reference indicate corresponding parts.

The slide-rest D is actuated, by the longitudinal feed-screw B, to move along on the slides or shears A of the bed-frame, in the usual manner, and the tool-rest I is actuated, by the cross-feed screw L, to move upon the slides $a$ $a$ of the slide-rest, also in the usual manner; but instead of operating the cross-feed screw by a crank-handle or hand-wheel, as was heretofore done, I affix a flanged drum or wheel, E, to the end of the cross-feed screw, as shown, and attach thereto wire or metallic ribbon, $b$, and connect the latter to some suitable fixed point, as the cross-bar J, affixed to the shears A of the bed-frame in the manner shown, where, when the slide-rest moves forward in obedience to the longitudinal feed-screw, the wire or ribbon $b$ causes the uniform revolution of the cross-feed screw, which feeds up the tool-rest, and the tool within the tool-holder G, in a regular manner, thereby cutting or boring the required taper with automatic exactness.

This invention is equally applicable to lathes furnished with a compound-feed rest, and in either case, all that is requisite to apply the invention is, to affix the drum E on the cross-feed screw in the place of the ordinary crank-handle, and attach the cross-bar J or its equivalent to the shears, at any desired point of the latter.

A set-screw, $d$, serves to clamp the end of the wire or ribbon $b$ in the obvious manner.

The degree of taper to be bored or cut depends upon the diameter of the drum and the pitch of the threads of both feed-screws, but in practice, the diameter of the drum only need be considered for any particular lathe.

This diameter is readily ascertainable by a simple calculation.

The face of the drum must be sufficiently broad to prevent the wire or ribbon from riding, and thereby destroying the even character of the taper formed.

I claim as new, and desire to secure by Letters Patent—

For operating the cross-feed screw of a lathe, the combination of the feed-screw with the pulley E, band $b$, bar J or its equivalent, all substantially as described.

LEWIS GRISCOM.

Witnesses:
JACOB SHELLEY,
T. HARRY BECHTEL.